United States Patent [19]

Gupta

[11] Patent Number: 5,274,038
[45] Date of Patent: Dec. 28, 1993

[54] CONTROLLED SURFACE OPTICAL LENS AND METHOD OF SURFACE ALTERATION

[75] Inventor: Amitava Gupta, Pasadena, Calif.

[73] Assignee: Ioptex Research Inc., Calif.

[21] Appl. No.: 647,842

[22] Filed: Jan. 30, 1991

Related U.S. Application Data

[63] Continuation of Ser. No. 118,300, Nov. 9, 1987, abandoned.

[51] Int. Cl.$^5$ .............................................. L08F 8/00
[52] U.S. Cl. ................................ 515/100; 523/106; 523/107; 515/103
[58] Field of Search ............... 525/100, 102; 523/106, 523/107

[56] References Cited

U.S. PATENT DOCUMENTS

| | | | |
|---|---|---|---|
| 3,988,274 | 10/1976 | Masuhara et al. | 523/106 |
| 4,098,840 | 7/1978 | Yoshida et al. | 525/102 |
| 4,143,017 | 3/1979 | Tarumi et al. | 523/106 |
| 4,163,608 | 8/1979 | Neefe | 523/106 |
| 4,605,712 | 8/1986 | Mueller et al. | 525/100 |
| 4,611,892 | 9/1986 | Kawashima et al. | 350/165 |
| 4,613,380 | 9/1986 | Cheu | 134/26 |
| 4,615,882 | 10/1986 | Stockel | 525/102 |
| 4,742,136 | 5/1988 | Uchida | 523/106 |
| 4,745,158 | 5/1988 | Nakashima et al. | 523/106 |
| 4,752,627 | 6/1988 | Froix | 523/106 |

*Primary Examiner*—Bernard Lipman
*Attorney, Agent, or Firm*—Rosenman & Colin

[57] ABSTRACT

An optical lens of an acrylic polymer having an outermost surface modified in morphology to possess desired characteristics of low surface energy and high biological inertness. The modified surface is achieved by removing only molecular level irregularities in the outermost surface of an acrylic polymer optical lens body. The surface removal and smoothing process involves the steps of surface preparation and surface passivation. In surface preparation, the surface of the lens body is treated to render it wettable by a surface passivation reagent. In surface passivation, the surface prepared optical lens body is immersed in a surface passivation reagent which removes weakly bound water molecules from the outermost surface of the lens body and reorganizes or smoothes at the molecular level irregularities at the surface of the optical lens body.

5 Claims, 4 Drawing Sheets

CONTROLLED SURFACE OPTICAL LENS AND METHOD OF SURFACE ALTERATION

CROSS-REFERENCE

This is a continuation of Ser. No. 118,300 filed Nov. 9, 1987, abandoned.

BACKGROUND OF INVENTION

The present invention relates to improvements in artificial optical lenses such as contact lenses, intraocular lenses and intracorneal implants, and, more particularly to such optical lenses having an outermost surface of modified morphology to provide improved biological inertness.

It has been postulated that the interaction of an implant surface of an optical lens with surrounding biological tissue which results in bacterial colonization and tissue integration adjacent the implant is controlled by long range attractive hydrophobic interactions which extend outward from the implant surface a distance up to 300 Angstroms. See for example Gristina, A., "Biomaterial-Centered Infection: Microbial Adhesion Versus Tissue Integration," Science, Vol. 237, pp. 1588. Such long range attractive hydrophobic interactions may be attributed to changes in entropy associated with disruption of the supramolecular structure of water molecules in liquid water at the implant surface immersed in an aqueous medium. The precise molecular structure of the implant surface and its interaction with its environment determines the energetics of electrostatic or exchange interactions. However, the undesired long range attractive hydrophobic interactions cannot be effected by changing electrostatic or exchange interactions at the implant surface since such interactions are short range in character and rarely extend beyond 20 Angstroms from the surface. Therefore, changes in the molecular structure of an implant surface are inadequate to prevent inflammatory reactions or tissue irritation commonly associated with optical lens implants.

As distinguished from attempts to reduce inflammatory reactions and tissue irritations by changing electrostatic or exchange interactions at an implant surface, I have discovered a surface passivation process which when applied to an acrylic polymer optical lens, forms a surface of reduced energy and high biological inertness. Such optical lenses have been found to possess superior anti-inflammatory and minimal tissue irritation qualities. The low surface energy associated with my surface passivation process is achieved by removing molecular level irregularities from the surface of the optical lens resulting in a smooth passivated surface layer with minimum interaction with biological tissue. More particularly, I have found that the morphology of the implant surface of an optical lens controls the increase in entropy and consequently the overall free energy associated with the destruction of the highly organized structure of hydrogen bonded oligomers of water molecules existing in liquid water at an implant surface immersed in an aqueous medium. When a tissue or a biomolecule approaches the implant surface of my surface passivated optical lens immersed in an aqueous medium, water molecules which have been displaced from their stable position by the implant surface interact with the tissue surface of the biomolecule. Such interaction provides an additional site for the development of hydrogen bonded intermolecular structures. This leads to a decrease in the entropy and the free energy of the system which comprises the implant surface, the surrounding aqueous medium, and the approaching biological material.

SUMMARY OF INVENTION

Generally speaking, in my present invention, an optical lens body of an acrylic polymer is characterized by an outermost surface modified in morphology to possess the characteristic of low surface energy and high biological inertness. To achieve such characteristics, the outermost surface of the optical lens body is smoothed by removing only molecular level irregularities. The process of removing such irregularities involves the steps of surface preparation and surface passivation. In the surface preparation step, the surface of the lens body is treated to render it wettable by a passivation reagent in the subsequent surface passivation step. In the surface passivation step, the optical lens body prepared by the surface preparation step to have weakly bound water molecules at its outermost surface, is immersed in a silane reagent which reacts with the water molecules removing them from the outermost surface and undergoes an oligomerization reaction. This process reorganizes or smoothens molecular level irregularities at the surface of the optical lens body. The resulting surface is smooth and possesses a low surface energy and superior biological inertness.

DETAILED DESCRIPTION OF INVENTION

As previously stated, my present invention provides an optical lens having a lens body of an acrylic polymer. The outermost surface of the lens body is altered in morphology to possess the desired characteristic of biological inertness.

Figure 1:
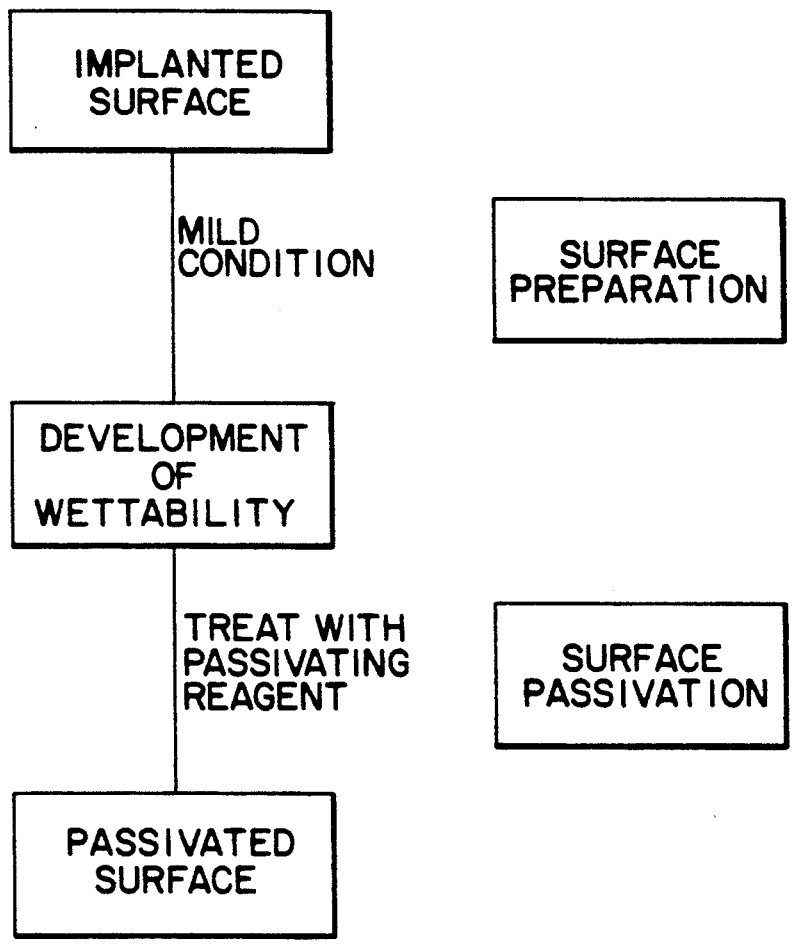
FIG. 1 is a flow diagram, in block form, of my surface alteration process as it is applied to alter the surface morphology (surface passivation) of an optical lens implant to possess the desired characteristic of improved biological inertness.

The surface alteration process is depicted in FIG. 1 and is utilized to create a smoother, more regular surface morphology (surface passivation). The passivation process is applicable to all hydrophobic acrylic polymers, including all polymers and copolymers of alkyl acrylates and methacrylates, with the exception of those monomers, such as 2-hydroxyethyl methacrylate which impart hydrophilicity to the formulation or enhance its water solubility.

Figure 2A:
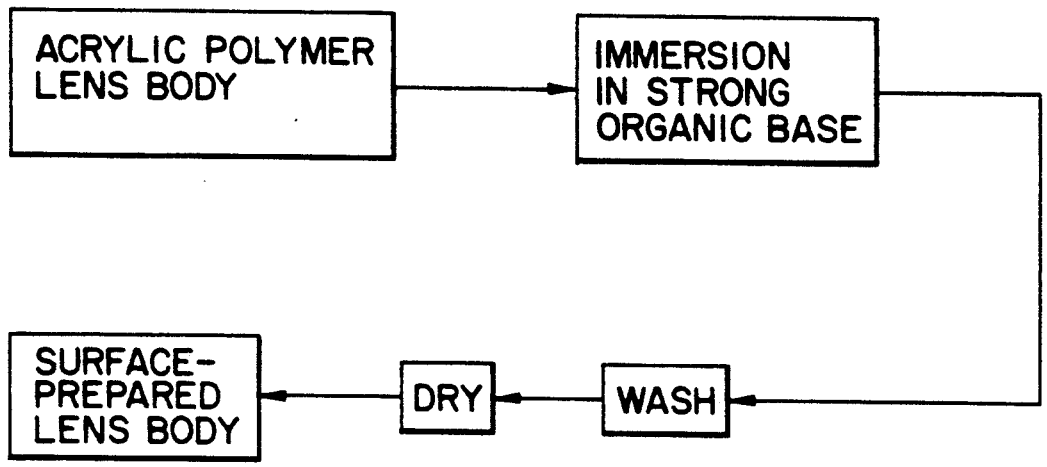
FIG. 2a is a flow diagram, in block form, of the surface preparation step included in my surface alteration process.
Figure 2C:
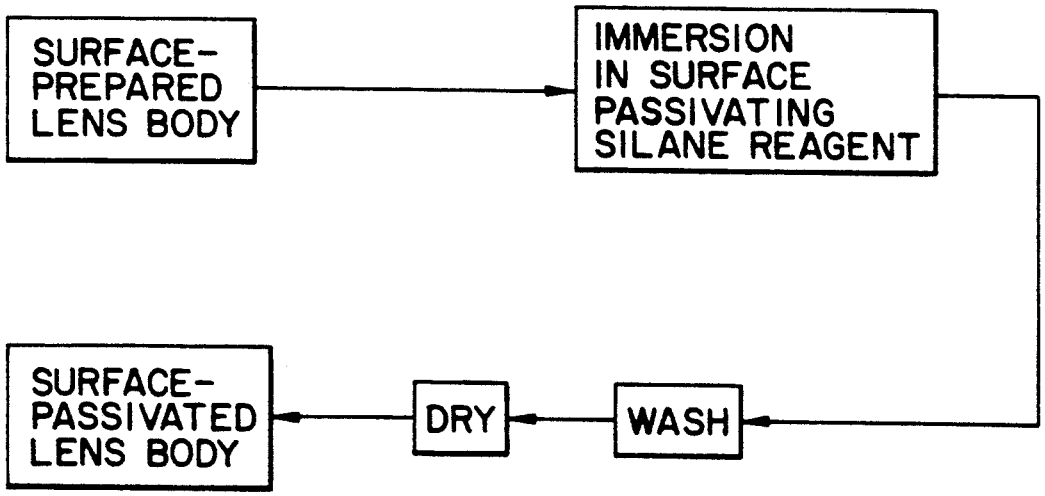
FIG. 2c is a flow diagram, in block form, of the surface passivation step included in my surface alteration process.
Figure 2B:
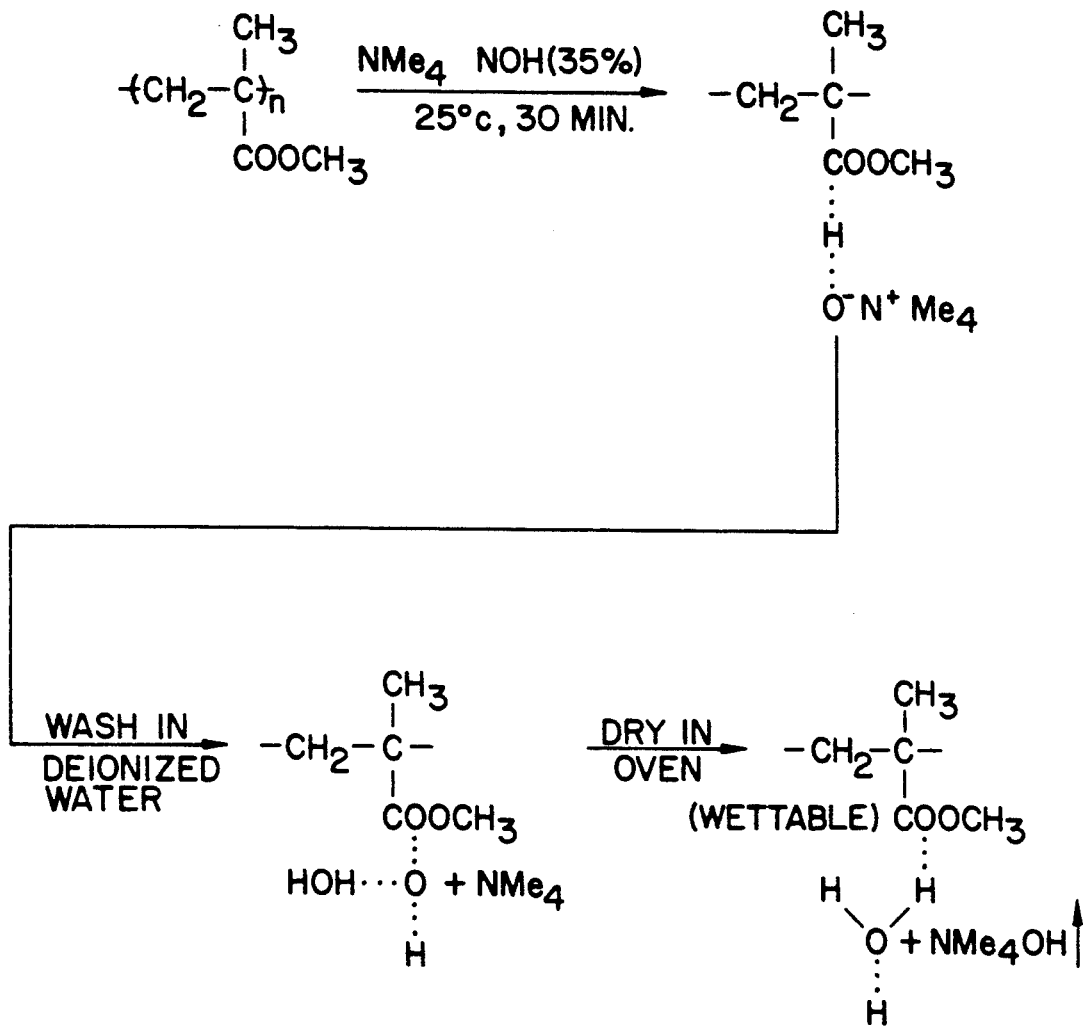
FIG. 2b is a schematic showing the chemical reactions in the surface preparation step of FIG. 2a, the surface preparation step rendering the surface of the optical lens body wettable so that the subsequent passivation process occurs uniformly over the surface of the lens body.
Figure 2D:
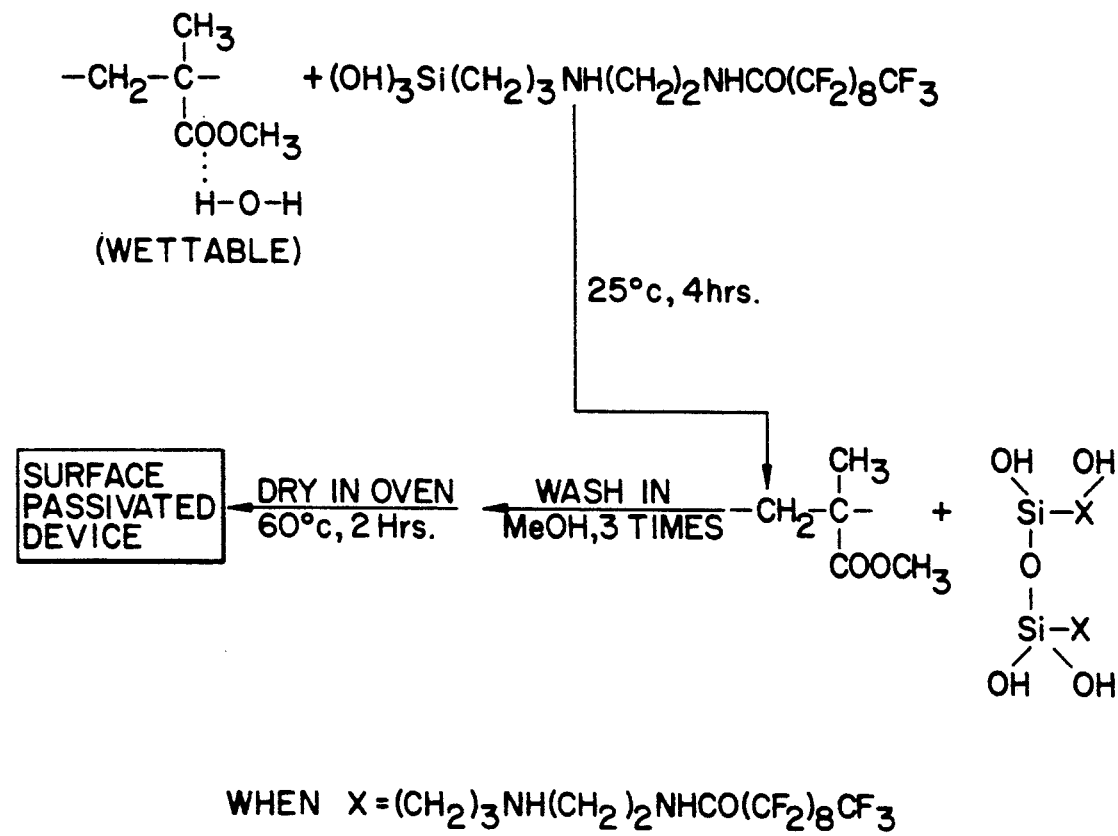
FIG. 2d is a schematic showing the chemical reaction in the surface passivation step of FIG. 2c.

The passivation process is shown in FIGS. 2c and 2d and is designed to develop a change in the organization of polymer chains only at the outermost surface of the optical lens. Accordingly, the process is carried out under conditions which do not permit invasion of the treating reagents into the bulk of the optical lens. Further, prior to the surface passivation process, it is necessary to render the lens body wettable by the passivating reagent, so that the passivation process occurs uniformly over the surface of the lens body.

The surface preparation step is illustrated in FIGS. 2a and 2b. The surface is rendered wettable through a process of complexation of water molecules to the polymer chains at the outermost surface of the acrylic optical lends body. In particular, carboxylate esters pendant on polymer chains at the outermost surface of the lens body serve as sites for the binding of water molecules. In order to develop binding between the hydrophobic carboxylate esters at the surface of the lens body and water molecules, it is necessary to form hydrogen bonds between carboxylate oxygen atoms on the surface of the lens body and hydroxyl groups on the water molecules. The formation of hydrogen bonds between the water molecules and the carboxylate oxygen atoms on the ester groups on the polymer chains at the lens body surface is mediated by an intermediate attachment of a strong organic base, such as tetramethyl ammonium hydroxide to the same carboxylate oxygen atoms. I have found that a series of tetraalkyl ammonium hydroxide reagents can perform this function. For plymethyl methacrylate surface, I have found that tetra methyl ammonium hydroxide provides the greatest uniformity of surface coverage by the surface passivating agent. For other acrylics, such as those containing poly (n-butyl acrylate) chains, tetra n-butyl ammonium hydroxide is the most efficacious reagent.

More particularly, in the chemical reaction depicted in FIG. 2b, the acrylic polymer lens body is reacted with a tetraalkylammonium hydroxide at room temperature for about 30 minutes. Preferably, the reagent comprises a highly concentrated (e.g., 35%) aqueous solution of tetramethylammonium hydroxide. The lens body is immersed in such a reagent at 25° C. (room temperature) for about 30 minutes.

After immersion, the lens body is withdrawn from the solution and washed thoroughly with distilled water in order to remove any unbound reagent (base) and to allow water molecules to become hydrogen bonded to the surface. The acrylic optical lens body is then dried in a convection air oven for several hours at an elevated temperature. The organic base being volatile, is driven off leaving weakly bound water molecules at the surface of the acrylic lens body as shown in FIG. 2b.

Surfaces of polymethyl methacrylate intraocular lenses prepared in the foregoing manner were examined by conventional spectroscopic techniques, such as Fourier Transform Infrared Spectroscopy in the Attenuated Total Reflectance Mode in order to determine if any tetramethyl ammonium hydroxide remained on the surface subsequent to the drying step. The results indicated that no detectable levels of the reagent remained on the surface.

Subsequent to surface preparation, the acrylic lens body is immersed in a methanol solution of the surface passivating reagent, as shown in FIG. 2d. The surface passivating agent is a reactive silane which is highly reactive (attractive) towards water molecules. Preferably the silane reagent is a trialkoxy aminosilane. By way of example, a silane reagent can be synthesized by reaction of γ-aminopropyl N aminoethyl trialkoxysilane commercially available as Z-6020 from the Dow Corning Corporation with perfluorodecanoic acid in an anhydrous methanol solution. This reaction is carried out by adding a methanol solution of the trialkoxysilane derivative at a concentration from $5 \times 10^{-2}$ m/l to $1 \times 10^{-4}$ m/l to an equimolar concentration of perfluorodecanoic acid, also in methanol, then refluxing the mixture under dry $N_2$ gas for 6 hours. This reaction produces one major product which is an amide, and two minor products, one a siloxane and the other a secondary amide. The solution may be stored under air and water free conditions. The solution is diluted with 1% deionized water volume by volume prior to use. The addition of water converts the alkoxysilane amide derivative to the silanol as depicted in FIG. 2d.

As depicted in FIG. 2d, the silane reagent reacts with the weakly bound water molecules on the surface of the lens body and undergoes an oligomerization reaction. In removing the bound water molecules on the surface, the passivating reagent increases the free energy of the surface during the period of its residence on the surface. The added free energy activates the polymer chain segments at the outermost surface layer and provides the chain segments with enough energy to reorganize themselves into stable conformations. As a result, the surface morphology becomes smooth subsequent to the passivation treatment.

To verify my surface passivation process, several hundred intraocular lens implants made from PMMA were subjected to my surface passivation treatment. Following surface passivation, the intraocular lens bodies were examined by elemental analysis and FT-IR (ATR) spectroscopy in order to determine if residual surface passivating reagents remained on the lens surface. All such measurements yielded negative results. The contact angle of the surface passivated implants were measured on a goniometer, using 0.1 ml drops of deionized water. The contact angles ranged from 88° to 92°, measured over 360 implants.

To check the efficacy of the biological inertness of the outermost surface of the optical lens bodies passivated by the foregoing process, several batches of intraocular lenses formulated as described, were surface modified to achieve a contact angle of 91±1°. An acute corneal touch study on cat models was performed at the Dean McGee Eye Institute, University of Oklahoma, using the surface modified intraocular lenses and comparing them with identical intraocular lenses that were not surface modified (Control lenses). The results of the study are set forth in the following Table 1 wherein data is expressed in terms of area of cell damage in square microns measured by a scanning electron microscope. Based upon the study, the Dean McGee Eye Institute concluded that "the test lenses showed significant improvement compared with control lenses."

TABLE 1

Scanning electronic microscopic analysis of the damage to endothelial cells in an acute corneal touch study on cat models.

| Cat No. | Area of Damage (Square Microns) | Lens Code |
|---|---|---|
| 1 | $3.7 \times 10^6$ | Control |
| 1 | $2.5 \times 10^5$ | Surface Modified |
| 2 | $6.2 \times 10^6$ | Control |
| 2 | $5.0 \times 10^5$ | Surface Modified |
| 3 | $2.3 \times 10^6$ | Control |
| 3 | $2.5 \times 10^5$ | Surface Modified |
| 4 | $3.4 \times 10^6$ | Control |
| 4 | $3.2 \times 10^5$ | Surface Modified |

TABLE 1-continued

Scanning electronic microscopic analysis of the damage to endothelial cells in an acute corneal touch study on cat models.

| Cat No. | Area of Damage (Square Microns) | Lens Code |
|---|---|---|
| 5 | $2.6 \times 10^6$ | Control |

From the foregoing, it should be appreciated that my present invention provides a lens body of an acrylic polymer characterized by an outermost surface of modified morphology and possessing the characteristic of superior biological inertness. While specific examples of chemical reactions and formulations for producing such characteristics have been described in detail, the present invention is not limited to such. Rather, the invention is to be limited of scope only by the terms of the following claims.

I claim:

1. An optical lens comprising:
a lens body of an acrylic polymer; and
an outermost surface of the lens body having a morphology altered to possess a low surface energy and high biological inertness by complexing water molecules to polymer chains at the outermost surface of the lens body to render the surface wettable by a passivating reagent and by immersing the lens body in a reactive silane reagent to attract and remove the water molecules leaving the surface with a smoother, more regular morphology.

2. The optical lens of claim 1, wherein the water molecules are complexed to polymer chains at the outermost surface of the lens body by immersing the acrylic lens body in a strong organic base.

3. The optical lens of claim 2, wherein the strong organic base is a tetraalkyl ammonium hydroxide 4. The optical lens of claim 3, wherein the acrylic lens body is immersed in the tetraalkyl ammonium hydroxide, washed in deionized water to remove any organic base and to allow water molecules to become hydrogen bonded to the outermost surface of the lens body, and dried to drive off the organic base leaving weakly bound water molecules at the surface of the lens body.

5. The optical lens of claim 1, wherein the silane reagent is a trialkoxyamino silane.

* * * * *